United States Patent
John Wilson et al.

(10) Patent No.: US 9,942,886 B1
(45) Date of Patent: Apr. 10, 2018

(54) VARIABLE PHYSICAL UPLINK CONTROL CHANNEL (PUCCH) SIGNALING AND TRANSMISSION

(71) Applicant: QUALCOMM Incorporated, San Diego, CA (US)

(72) Inventors: Makesh Pravin John Wilson, San Diego, CA (US); Tao Luo, San Diego, CA (US); Sumeeth Nagaraja, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/630,276

(22) Filed: Jun. 22, 2017

Related U.S. Application Data

(60) Provisional application No. 62/405,789, filed on Oct. 7, 2016, provisional application No. 62/469,710, filed on Mar. 10, 2017, provisional application No. 62/470,188, filed on Mar. 10, 2017.

(51) Int. Cl.
*H04W 72/04* (2009.01)
*H04B 7/06* (2006.01)

(52) U.S. Cl.
CPC ........ *H04W 72/0413* (2013.01); *H04B 7/068* (2013.01); *H04B 7/0617* (2013.01)

(58) Field of Classification Search
CPC .............................. H04W 16/28; H04W 72/04
See application file for complete search history.

(56) References Cited

U.S. PATENT DOCUMENTS

| | | |
|---|---|---|
| 8,983,547 B2 | 3/2015 | Jeong et al. |
| 9,363,683 B2 | 6/2016 | Raghavan et al. |
| 2009/0258654 A1* | 10/2009 | Hagerman ............ H04W 16/28 455/452.1 |

(Continued)

FOREIGN PATENT DOCUMENTS

| | | |
|---|---|---|
| WO | WO-2017136732 A1 | 8/2017 |
| WO | WO-2017138980 A1 | 8/2017 |
| WO | WO-2017151876 A1 | 9/2017 |

OTHER PUBLICATIONS

International Search Report and Written Opinion—PCT/US2017/050135—ISA/EPO—dated Nov. 28, 2017.

(Continued)

*Primary Examiner* — Brandon Renner
(74) *Attorney, Agent, or Firm* — James Hunt Yancey, Jr.; Qualcomm IP Group

(57) ABSTRACT

Wireless communications systems and methods related to transmitting uplink control information. A first wireless communication device receives a transmission configuration indicating first beam information and second beam information. The first beam information and the second beam information are different. The first wireless communication device transmits a first uplink control signal based on the first beam information. The first wireless communication device transmits a second uplink control signal based on the second beam information. The first uplink control signal and the second uplink control signal represent the same control information. Other aspects, embodiments, and features are also claimed and described.

30 Claims, 12 Drawing Sheets

(56) References Cited

U.S. PATENT DOCUMENTS

| | | | |
|---|---|---|---|
| 2013/0040684 A1* | 2/2013 | Yu | H04B 7/0617 |
| | | | 455/517 |
| 2013/0182683 A1* | 7/2013 | Seol | H04W 72/046 |
| | | | 370/335 |
| 2013/0217404 A1* | 8/2013 | Jung | H04W 72/08 |
| | | | 455/452.1 |
| 2013/0286960 A1 | 10/2013 | Li et al. | |
| 2015/0124738 A1* | 5/2015 | Ramakrishna | H04L 5/0048 |
| | | | 370/329 |
| 2015/0358115 A1* | 12/2015 | Wang | H04W 72/0446 |
| | | | 714/776 |
| 2016/0099763 A1 | 4/2016 | Chen | |
| 2016/0174244 A1* | 6/2016 | Kim, II | H04W 72/1284 |
| | | | 370/329 |
| 2016/0219475 A1* | 7/2016 | Kim | H04W 76/025 |
| 2016/0277976 A1 | 9/2016 | Takahashi et al. | |
| 2016/0294463 A1 | 10/2016 | He | |
| 2016/0295502 A1 | 10/2016 | Yoon et al. | |
| 2016/0295561 A1* | 10/2016 | Papasakellariou | H04W 72/042 |
| 2016/0360425 A1* | 12/2016 | Huang | H01Q 21/00 |
| 2017/0111806 A1* | 4/2017 | Roh | H01Q 3/00 |
| 2017/0164377 A1* | 6/2017 | Ho | H04W 16/28 |
| 2017/0181193 A1* | 6/2017 | Park | H04W 74/0833 |

OTHER PUBLICATIONS

Mitsubishi Electric: "Beam Control Operation for Common Channels/Signals in NR", 3GPP Draft; R1-166228, Initial Access and Mobility, 3rd Generation Partnership Project (3GPP), Mobile Competence Centre; 650, Route Des Lucioles; F-06921, Sophia-Antipolis Cedex; France, vol. RAN WG1, Vo. Gothenburg, Sweden; 20160822-20160826, Aug. 21, 2016 (Aug. 21, 2016), XP051140131, pp. 1-10, Retrieved from the Internet: URL:http://www.3gpp.org/ftp/Meetings_3GPP_SYNC/RAN1/Docs/ [retrieved on Aug. 21, 2016].

ZTE: "Beamformed Random Access in NR", 3GPP Draft; R1-166419, Beam Formed Random Access in NR, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; 20160822-20160826, Aug. 21, 2016 (Aug. 21, 2016), XP051140220, 8 Pages, Retrieved from the Internet: URL: http://www.3gpp.org/ftp/Meetings_3GPP_SYNC/RAN1/Docs/ [retrieved on Aug. 21, 2016].

* cited by examiner

VARIABLE PHYSICAL UPLINK CONTROL CHANNEL (PUCCH) SIGNALING AND TRANSMISSION

CROSS REFERENCE TO RELATED APPLICATIONS

The present application claims priority to and the benefit of the U.S. Provisional Patent Application No. 62/405,789, filed Oct. 7, 2016, the U.S. Provisional Patent Application No. 62/469,710, filed Mar. 10, 2017, and the U.S. Provisional Patent Application No. 62/470,188, filed Mar. 10, 2017, which are hereby incorporated by reference in their entirety as if fully set forth below and for all applicable purposes.

TECHNICAL FIELD

The technology discussed in this disclosure relates generally to wireless communication systems, and more particularly to improving robustness of physical uplink control channel (PUCCH) decoding at transmission points (TXPs). Certain embodiments can enable and provide improved communication techniques allowing communication devices (e.g., user equipment devices or UEs) to transmit multiple copies of the same uplink control information in multiple beam directions to one or more TXPs.

INTRODUCTION

Wireless communication systems are widely deployed to provide various types of communications such as voice, data, video, etc. These systems may be multiple-access systems capable of supporting communication with multiple access terminals by sharing available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Typically, a wireless communication network comprises several base stations (BSs), wherein each BS communicates with a mobile station or user equipment devices (UEs) using a forward link and each mobile station (or access terminal) communicates with base station(s) using a reverse link. The forward link direction is also referred to as a downlink (DL) direction. The reverse link direction is also referred to as an uplink (UL) direction. A UE may synchronize to a BS for initial cell access and establish a connection with the BS. Subsequently, the BS and the UE may exchange data. To facilitate data exchange, the UE and the BS may exchange control information. Some examples of DL control information may include resource allocations and modulation coding schemes (MCSs). For example, the BS may send UL and DL resource allocation information and MCSs to the UE for UL and DL transmissions. Some examples of UL control information may include channel quality indicators (CQIs), data acknowledgements (ACKs), and not-ACKs (NAKs). For example, the UE may report a CQI to the BS so that the BS may select a suitable MCS for transmitting DL data to the UE. The UE may send an ACK or a NAK to the BS to indicate whether DL data is received correctly. Improving the robustness of UL control transmission may be beneficial to wireless communication.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a first wireless communication device, a transmission configuration indicating first beam information and second, different beam information; transmitting, by the first wireless communication device, a first uplink control signal based on the first beam information; and transmitting, by the first wireless communication device, a second uplink control signal based on the second beam information, with the same control information represented in the first uplink control signal.

In an additional aspect of the disclosure, a method of wireless communication includes transmitting, by a communication device, a transmission configuration indicating first beam information and second, different beam information; receiving, by the communication device, a first uplink control signal based on the first beam information; and receiving, by the communication device, a second uplink control signal based on the second beam information, with the same control information represented in the first uplink control signal.

In an additional aspect of the disclosure, an apparatus includes one or more antennas and a transceiver configured to receive, via the one or more antennas, a transmission configuration indicating first beam information and second, different beam information; transmit, via the one or more antennas, a first uplink control signal based on the first beam information; and transmit, via the one or more antennas, a second uplink control signal based on the second beam information, with the same control information represented in the first uplink control signal.

In an additional aspect of the disclosure, an apparatus includes one or more antennas and a transceiver configured to transmit, via the one or more antennas, a transmission configuration indicating first beam information and second, different beam information; receive, via the one or more antennas, a first uplink control signal based on the first beam information; and receive, via the one or more antennas, a second uplink control signal based on the second beam information, with the same control information represented in the first uplink control signal.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments such exemplary embodiments can be implemented in various devices, systems, and methods.

DETAILED DESCRIPTION

Figure 1:
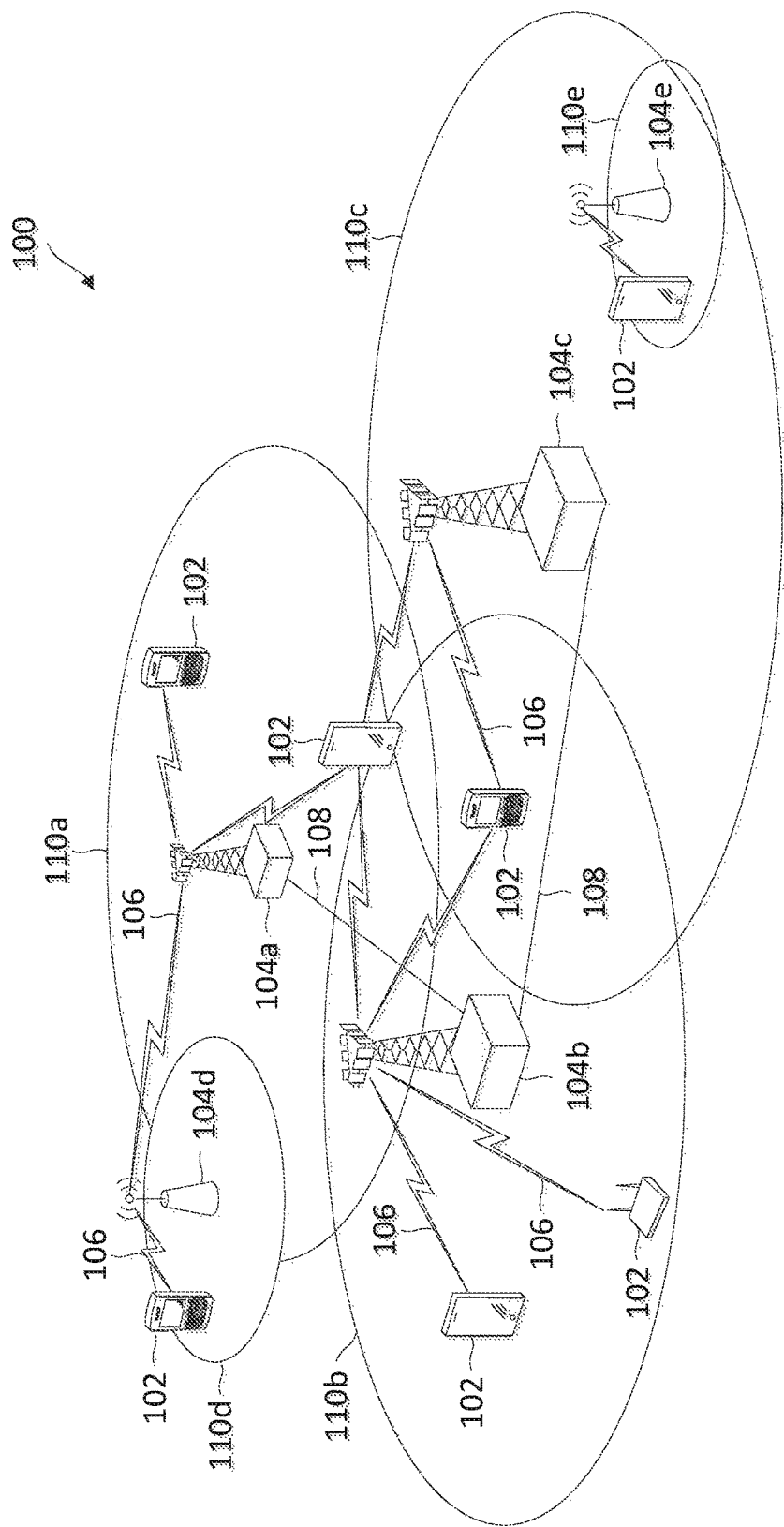
FIG. 1 illustrates a wireless communication network according to embodiments of the present disclosure.

The detailed description set forth below, about the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details. In some instances, well-known structures and components are shown in block diagram form to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWav bands) network.

The present application describes mechanisms for improving robustness for PUCCH decoding at BSs. In the disclosed embodiments, a UE may employ multiple links or channel paths for UL control information transmissions. The multiple links can provide transmit and/or receive diversity, and thus may improve transmission and decoding robustness. For example, the UE may transmit the same UL control information in multiple beam directions directed to different BSs (or other receiver nodes). Alternatively, the UE may transmit the same UL control information in multiple beam directions directed to the same BS (or same intended target). The BS may indicate resource allocations and/or transmission configurations for transmitting UL control information over multiple beams via a physical downlink control channel or a radio resource control (RRC) message at a network level. The UE may transmit an identical encoded version or a different encoded version of the UL control information over each beam. The UE may transmit a complete encoded version of the UL control information in each transmission time interval (TTI) so that each TTI may be decoded independently at a BS. The disclosed embodiments are suitable for use in any wireless communication networks. Each UE may transmit the same UL control information over any suitable number of beams.

FIG. 1 illustrates a wireless communication network 100 according to embodiments of the present disclosure. The network 100 may include a number of UEs 102, as well as a number of BSs 104. The BSs 104 may include an Evolve Node B (eNodeB) or a next Generation Node B (gNB). A BS 104 may be a station that communicates with the UEs 102 and may also be referred to as a base transceiver station, a node B, an access point, and the like.

The BSs 104 communicate with the UEs 102 as indicated by communication signals 106. A UE 102 may communicate with the BS 104 via a UL and a DL. The DL (or forward link) refers to the communication link from the BS 104 to the UE 102. The UL (or reverse link) refers to the communication link from the UE 102 to the BS 104. The BSs 104 may also communicate with one another, directly or indirectly, over wired and/or wireless connections, as indicated by communication signals 108. The BSs 104 may cooperatively perform joint transmission and reception to improve performance. In some embodiments, the BSs 104 may be transmission points (TXPs) operating as remote radio heads to transmit and receive signals for over-the-air interface with the UEs 102 and communicate with a central unit for baseband processing.

The UEs 102 may be dispersed throughout the network 100, as shown, and each UE 102 may be stationary or mobile. The UE 102 may also be referred to as a terminal, a mobile station, a subscriber unit, etc. The UE 102 may be any device configured to communicate wirelessly with another node, which may be a BS 104 and/or one or more other UEs 102, and may include any suitable wireless application. The UE 102 may be a cellular phone, a smartphone, a personal digital assistant, a wireless modem, a laptop computer, a tablet computer, a vehicle, a drone, a sensor node, an Internet of Things (IoT) device, industrial equipment, etc. The network 100 is one example of a network to which various aspects of the disclosure apply.

Each BS 104 may provide communication coverage for a particular geographic area. In 3GPP, the term "cell" can refer to this particular geographic coverage area of a BS and/or a BS subsystem serving the coverage area, depending on the context in which the term is used. In this regard, a BS 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS.

In the example shown in FIG. 1, the BSs 104a, 104b and 104c are examples of macro BSs for the coverage areas 110a, 110b and 110c, respectively. The BSs 104d and 104e are examples of pico and/or femto BSs for the coverage areas 110d and 110e, respectively. As will be recognized, a BS 104 may support one or multiple (e.g., two, three, four, and the like) cells.

The network 100 may also include relay stations. A relay station is a station that receives a transmission of data and/or other information from an upstream station (e.g., a BS, a UE, or the like) and sends a transmission of the data and/or other information to a downstream station (e.g., another UE, another BS, or the like). A relay station may also be a UE that relays transmissions for other UEs. A relay station may also be referred to as a relay BS, a relay UE, a relay, and the like.

The network 100 may support synchronous or asynchronous operation. For synchronous operation, the BSs 104 may have similar frame timing, and transmissions from different BSs 104 may be approximately aligned in time. For asynchronous operation, the BSs 104 may have different frame timing, and transmissions from different BSs 104 may not be aligned in time. Operations may alter between synchronous or asynchronous operation as desired or needed depending upon design or implementation parameters.

In some implementations, the network 100 utilizes orthogonal frequency division multiplexing (OFDM) on the DL and single-carrier frequency division multiplexing (SC-FDM) on the UL. OFDM and SC-FDM partition the system bandwidth into multiple (K) orthogonal subcarriers (sometimes referred to as tones, bins, or the like). Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

In an embodiment, the BSs 104 can assign or schedule transmission resources (e.g., in the form of time-frequency resource blocks) for DL and UL transmissions in the network 100. The communication can be in the form of radio frames. A radio frame may be divided into a plurality of subframes. In a FDD mode, simultaneous UL and DL transmissions may occur in different frequency bands. In a TDD mode, UL and DL transmissions occur at different time periods using the same frequency band. For example, a subset of the subframes in a radio frame may be used for DL transmissions and another subset of the subframes may be used for UL transmissions. The DL and UL subframes can be shared among the BSs 104 and the UEs 102, respectively.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 104 and the UEs 102. For example, a reference signal can have a particular pilot pattern or structure, where pilot tones may span across an operational bandwidth or frequency band, each positioned at a pre-defined time and a pre-defined frequency. Control information may include resource assignments and protocol controls. Data may include protocol data and/or operational data.

In the context of LTE, the BSs 104 may send DL control information in a physical downlink control channel (PDCCH) region of a DL subframe and DL data in a physical downlink shared channel (PDSCH) region of a DL subframe. The UEs 102 may send UL control information in a physical uplink control channel (PUCCH) region of a UL subframe and UL data in a physical uplink shared channel (PUSCH) region of a UL subframe.

In an embodiment, the BSs 104 can broadcast system information associated with the network 100. Some examples of system information may include physical layer information such as cell bandwidths and frame configurations, cell access information, and neighbor cell information. A UE 102 can access the network 100 by listening to the broadcast system information and requests connection or channel establishments with a BS 104. For example, the UE 102 can perform a random access procedure to begin communication with the BS 104 and subsequently may perform connection and/or registration procedures to register with the BS 104. After completing the connection and/or the registration, the UE 102 and the BS 104 can enter a normal operation stage, where operational data may be exchanged. In addition to data exchange, the BSs 104 and the UEs 102 may exchange control information. For example, the BSs 104 may send UL and/or DL resource allocation information and MCSs in a PDCCH for UL and/or DL transmissions. The UEs 102 may send CQIs, ACKs, and/or NAKs in a PUCCH.

In an embodiment, the network 100 may be a 5G new radio (NR) network. For example, the network 100 may operate in a mid-frequency band from about 1 gigahertz (GHz) to about 6 GHz. Alternatively, the network 100 may operate in a high frequency band, for example, at about 60 GHz, which is referred to as a millimeter wave (mmWav) band. Although operating in a higher frequency band can include a greater bandwidth, the path loss (PL) is higher than the conventional wireless systems. To overcome the higher PL, the BSs 104 and/or the UEs 102 may increase redundancy in transmissions and/or perform beamforming to create narrow beam patterns for transmissions, as described in greater detail herein.

Figure 2:
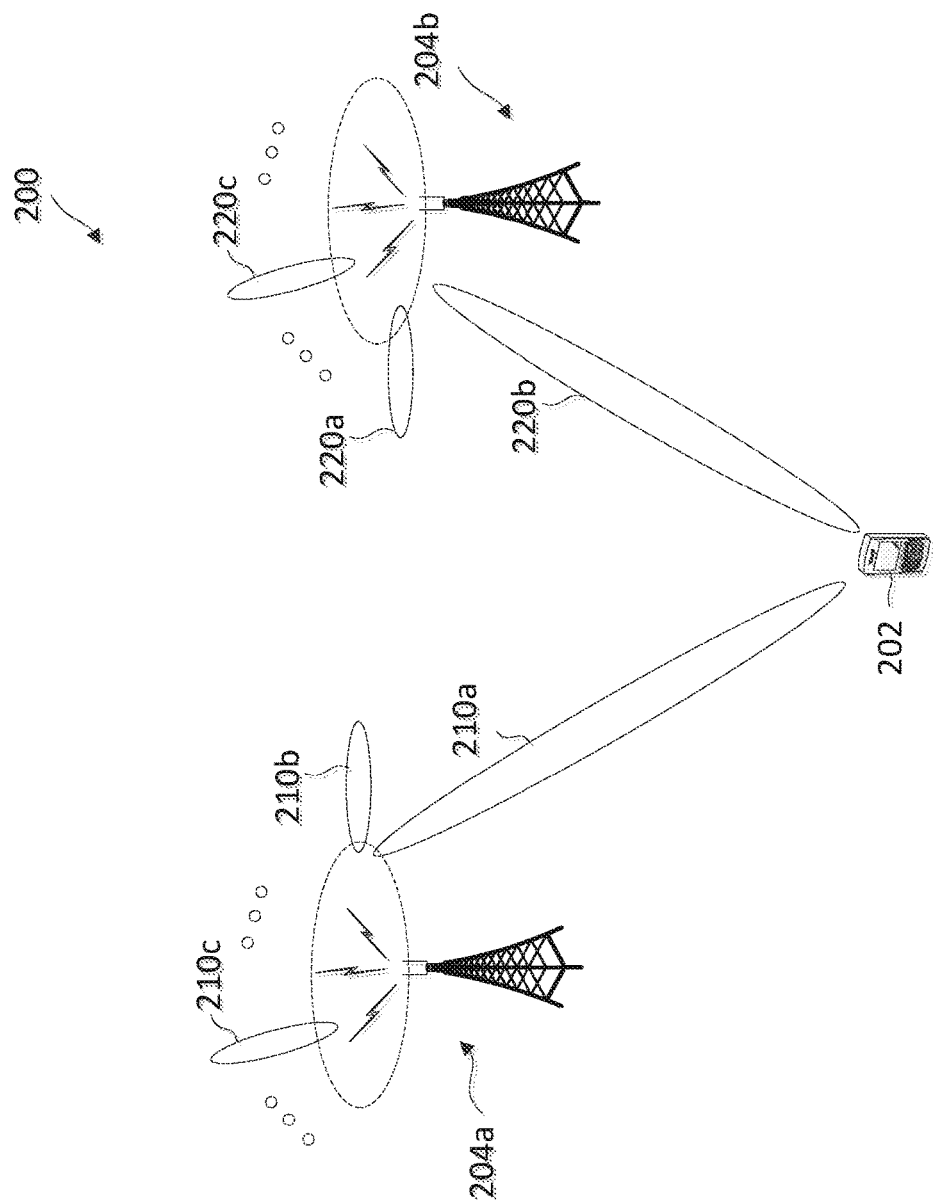
FIG. 2 illustrates a multiple-beam transmission scheme for transmitting uplink (UL) control information in a wireless communication network according to embodiments of the present disclosure.

FIG. 2 illustrates a multiple-beam transmission scheme for transmitting UL control information in a wireless communication network 200 according to embodiments of the present disclosure. The network 200 corresponds to a portion of the network 100. FIG. 2 illustrates two BSs 204 and one UE 202 for purposes of simplicity of discussion, though it will be recognized that embodiments of the present disclosure may scale to many more UEs 202 and/or BSs 204. The BSs 204 may be similar to the BSs 104. The UE 202 may be similar to the UEs 102. The UE 202 and the BSs 204 may communicate with each other at any suitable frequencies.

In the network 200, the BS 204a may transmit signals in multiple beam directions 210, shown as 210a, 210b, and 210c, and receive signals from the multiple beam directions 210. Similarly, the BS 204b may transmit signals in multiple beam directions 220, shown as 220a, 220b, and 220c, and receive signals from the multiple beam directions 220. The UE 202 has multiple link connections associated with different BSs 204. As shown, the UE 202 has one link connection to the BS 204a in the beam direction 210a and another link connection to the BS 204b in the beam direction 220b. For example, the BSs 204 and the UE 202 may employ beamforming (e.g., via spatial filtering or via electrical delay components) to transmit or receive signals in particular beam directions. A directional beam may have a greatest power in a specific direction. As an example, the UE 202 may communicate with the BS 204a by creating a signal beam with beam patterns radiating in the beam direction 210a and may communicate with the BS 204b by creating a signal beam with beam patterns radiating in the beam direction 210b.

To improve the robustness or performance of UL control information transmission, the UE 202 transmits the same UL control information (e.g., information bits representing a CQI, an ACK, or a NAK) in the beam direction 210a directed to the BS 204a and in the beam direction 220b directed to the BS 204b. The UEs 202 may repeat the UL control information or encode the UL control information with different redundancy versions (RVs) when transmitting the UL control information in multiple beam directions 210a and 220b. The UE 202 may simultaneously transmit the UL control information in the multiple beam directions 210a and 220b or employ a TDM scheme, as described in greater detail herein. The BS 204a and 204b may jointly decode the UL control information, for example, by performing soft combining. Thus, the transmission of UL control information over the multiple link connections with different BSs 204 can improve decoding robustness of UL control information at the BSs 204.

Figure 3:
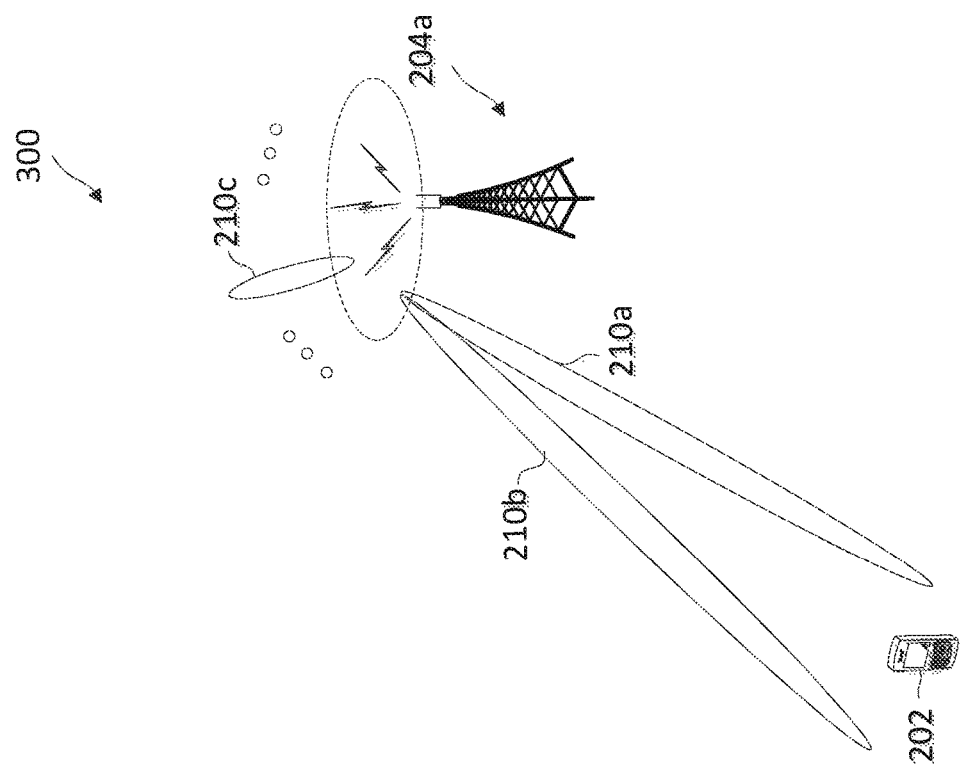
FIG. 3 illustrates a multiple-beam transmission scheme for transmitting UL control in a wireless communication network according to embodiments of the present disclosure.

FIG. 3 illustrates a multiple-beam transmission scheme for transmitting UL control in a wireless communication network 300 according to embodiments of the present disclosure. The network 300 corresponds to a portion of the network 100. FIG. 3 illustrates one BS 204 and one UE 202 for purposes of simplicity of discussion, though it will be recognized that embodiments of the present disclosure may scale to many more UEs 202 and/or BSs 204. The UE 202 and the BS 204a may communicate with each other at any suitable frequencies.

Similar to the network 200, the BS 204a may transmit signals in multiple beam directions 210 and receive signals from the multiple beam directions 210. However, the UE 202 has multiple link connections associated with the BS 204a. As shown, the UE 202 has two link connections to the BS 204a, one in the beam direction 210a and another in the beam direction 210b.

To improve the robustness or performance of UL control information transmission, the UE 202 transmits the same UL control information in the beam direction 210a and 210b directed to the BS 204a. The UE 202 may repeat the UL control information or encode the UL control information with different RVs for transmission in the multiple beam directions 210a and 210b. The UE 202 may simultaneously transmit the UL control information in the multiple beam direction 210a and 210b or employ a TDM scheme, as described in greater detail herein. The BS 204 may jointly decode the UL control information received from both the beam directions 210a and 210b, for example, by performing soft combining. Thus, the transmission of UL control information over the multiple link connections to the BS 204a can improve decoding robustness of UL control information at the BS 204a.

Figure 4:
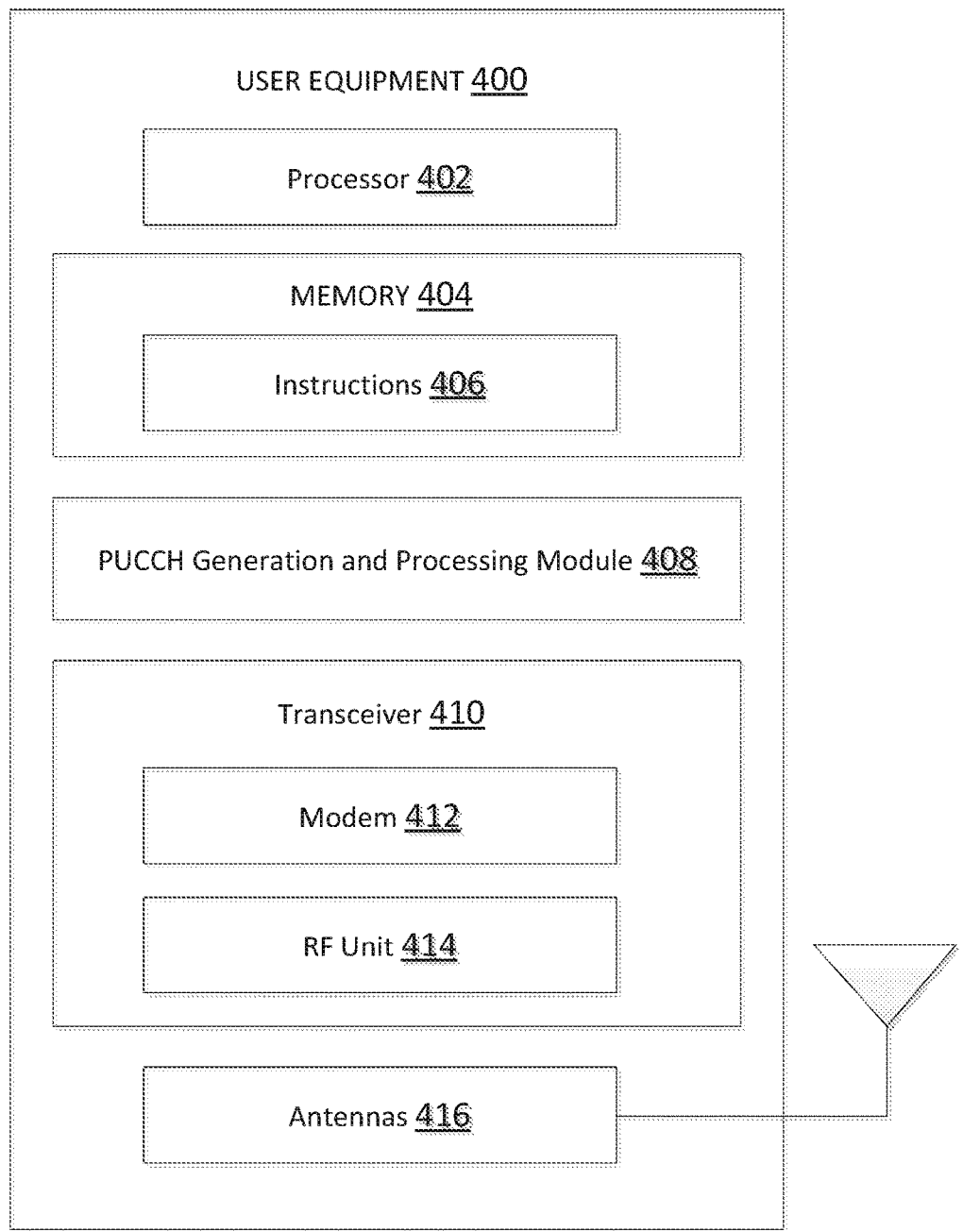
FIG. 4 is a block diagram of an exemplary user equipment (UE) according to embodiments of the present disclosure.

FIG. 4 is a block diagram of a UE 400 according to embodiments of the present disclosure. The UE 400 may be a UE 102 or 202 as discussed above. As shown, the UE 400 may include a processor 402, a memory 404, a PUCCH generation and processing module 408, a transceiver 410 including a modem subsystem 412 and a RF unit 414, and an antenna 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 102 and 202 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The PUCCH generation and processing module 408 may be implemented via hardware, software, or combinations thereof. For example, the PUCCH generation and processing module 408 may be implemented as a processor, circuit, and/or instructions 406 stored in the memory 404 and executed by the processor 402. The PUCCH generation and processing module 408 may be used for various aspects of the present disclosure. For example, the PUCCH generation and processing module 408 is configured to generate UL control information (e.g., CQIs, ACKs, and NAKs), encode the UL control information with repetitions or RVs, and schedule transmission of the encoded UL control information in multiple beam directions (e.g., the beam directions 210, 220, and 310), as described in greater detail herein.

As shown, the transceiver 410 may include the modem subsystem 412 and the RF unit 414. The transceiver 410 can be configured to communicate bi-directionally with other devices, such as the BSs 104, and 204. The modem subsystem 412 may be configured to modulate and/or encode the data from the memory 404 and/or the PUCCH generation and processing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 102 or a BS 104. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 102 to enable the UE 102 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of UL control information according to embodiments of the present disclosure. The antenna 416 may further receive data messages transmitted from other devices. This may include, for example, reception of UL control information transmission configurations or signaling according to embodiments of the present disclosure. The antenna 416 may provide the received data messages for processing and/or demodulation at the transceiver 410. Although FIG. 4 illustrates antenna 416 as a single antenna, antenna 416 may include multiple antennas of similar or different designs in order to sustain multiple transmission links. The RF unit 414 may configure the antenna 416

Figure 5:
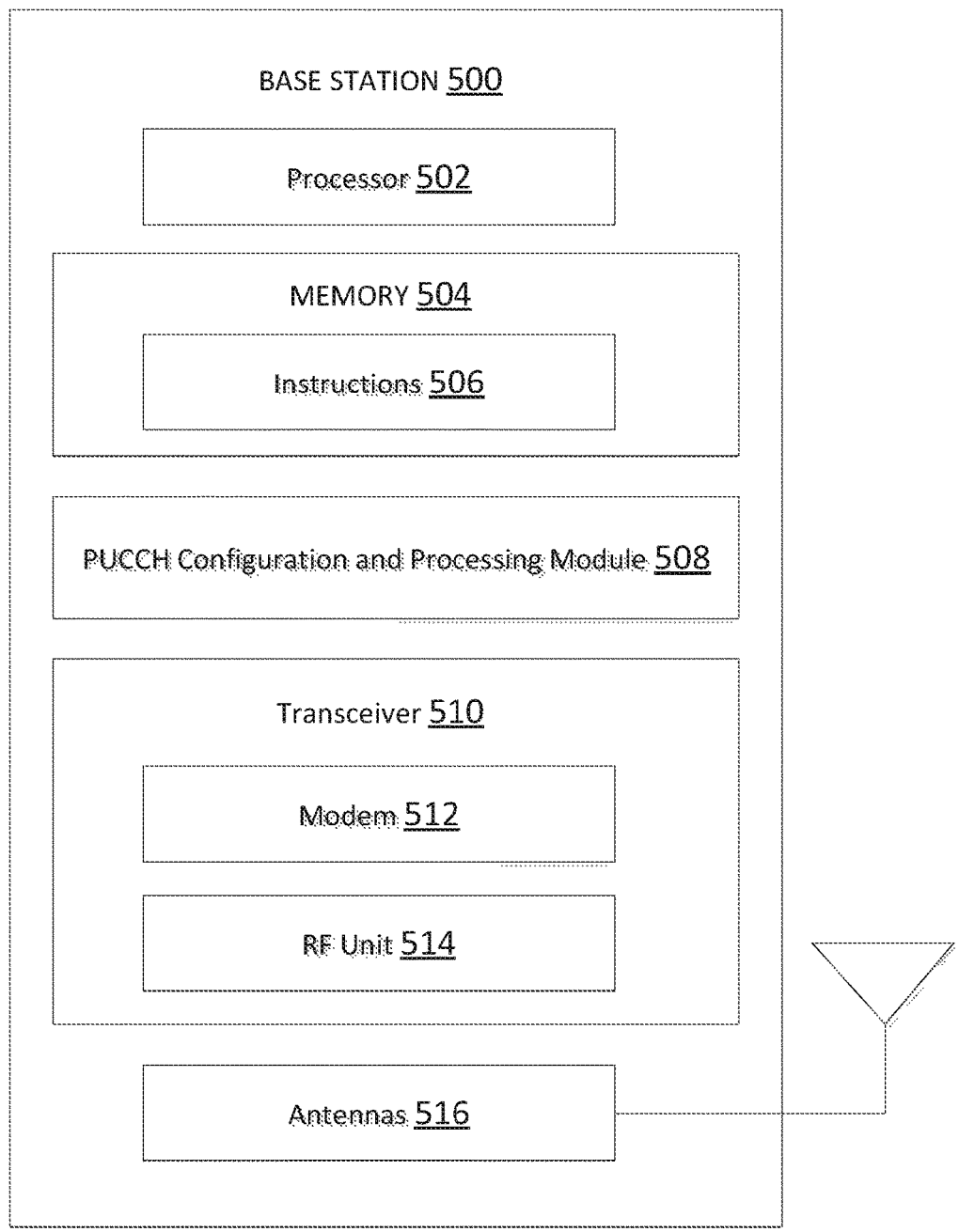
FIG. 5 illustrates a block diagram of an exemplary base station (BS) according to embodiments of the present disclosure.

FIG. 5 illustrates a block diagram of an exemplary BS 500 according to embodiments of the present disclosure. The BS 500 may be a BS 104, or 204 as discussed above. A shown, the BS 500 may include a processor 502, a memory 504, a PUCCH configuration and processing module 508, a transceiver 510 including a modem subsystem 512 and a RF unit 514, and an antenna 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 4.

The PUCCH generation and processing module 508 may be implemented via hardware, software, or combinations thereof. For example, the PUCCH generation and processing module 508 may be implemented as a processor, circuit, and/or instructions 506 stored in the memory 504 and executed by the processor 502. The PUCCH configuration and processing module 508 may be used for various aspects of the present disclosure. For example, the PUCCH configuration and processing module 508 may schedule UL control information transmission and decode UL control information received from a UE (e.g., the UEs 102 or 202), as described in greater detail herein.

As shown, the transceiver 510 may include the modem subsystem 512 and the RF unit 514. The transceiver 510 can be configured to communicate bi-directionally with other devices, such as the UEs 102 and 202 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 102. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 104 to enable the BS 104 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of information to complete attachment to a network and communication with a camped UE 102 according to embodiments of the present disclosure. The antenna 516 may further receive data messages transmitted from other devices and provide the received data messages for processing and/or demodulation at the transceiver 510. Although FIG. 5 illustrates antenna 516 as a single antenna, antenna 516 may include multiple antennas of similar or different designs in order to sustain multiple transmission links.

In some embodiments, the BS 500 may operate as a TXP. In such embodiments, the BS 500 may not include the modem subsystem 512 and the PUCCH configuration and processing module 508. The BS 500 may transmit and receive signals over-the-air to a UE via the RF unit 514 and the antenna 516. The BS 500 may interface with a central unit for performing functions of the modem subsystem 512 and the PUCCH configuration and processing module 508. The BS 500 may include another interface, such as an optical interface, for communication with the central unit, as described in greater detail herein.

Figure 6:
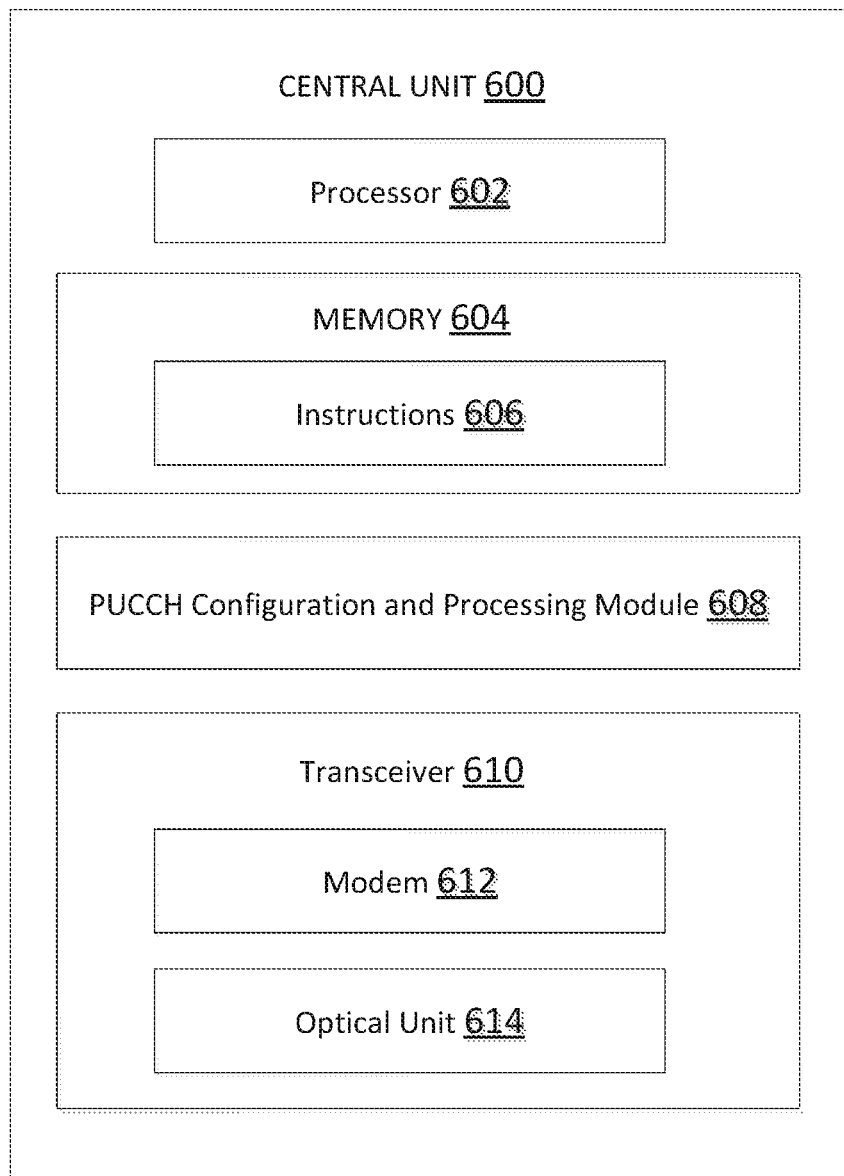
FIG. 6 illustrates a block diagram of an exemplary central unit according to embodiments of the present disclosure.

FIG. 6 illustrates a block diagram of an exemplary central unit 600 according to embodiments of the present disclosure. The central unit 600 may communicate with the BSs 104, 204, and 500. A shown, the central unit 600 may include a processor 602, a memory 604, a PUCCH configuration and processing module 608, and a transceiver 610 including a modem subsystem 612 and an optical unit 614. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 7.

The PUCCH configuration and processing module 608 may be used for various aspects of the present disclosure. The PUCCH configuration and processing module 608 may be substantially similar to the PUCCH configuration and processing module 508. For example, For example, the PUCCH configuration and processing module 508 may schedule UL control information transmission and decode UL control information received from a UE (e.g., the UEs 102 and 202).

As shown, the transceiver 610 may include the modem subsystem 612 and the optical unit 614. The transceiver 610 can be configured to communicate bi-directionally with other devices, such as the BSs 104, 204, and 500 operating as TXPs and/or another core network element. The modem subsystem 612 may be configured to modulate and/or encode data according to a MCS, e.g., a LDPC coding scheme, a turbo coding scheme, a convolutional coding scheme, etc. The optical unit 614 may include electrical-to-optical (E/O) components and/or optical-to-electrical (O/E) components that convert an electrical signal to an optical signal for transmission to a BS operating as a TXP and/or receive an optical signal from the BS and convert the optical signal into an electrical signal, respectively. The optical unit 614 may be configured to process (e.g., perform analog to digital conversion or digital to analog conversion, optical to electrical conversion or electrical to optical conversion, etc.) modulated/encoded data from the modem subsystem 612 (on outbound transmissions) or of transmissions originating from another source such as a backend or core network. Although shown as integrated together in transceiver 610, the modem subsystem 612 and the optical unit 614 may be separate devices that are coupled together at the central unit 600 to enable the central unit 600 to communicate with other devices. The optical unit 614 may transmit optical signal carrying the modulated and/or processed data over an optical link. The optical unit 614 may further receive optical signals carrying data messages and provide the received data messages for processing and/or demodulation at the transceiver 610.

Figure 7:
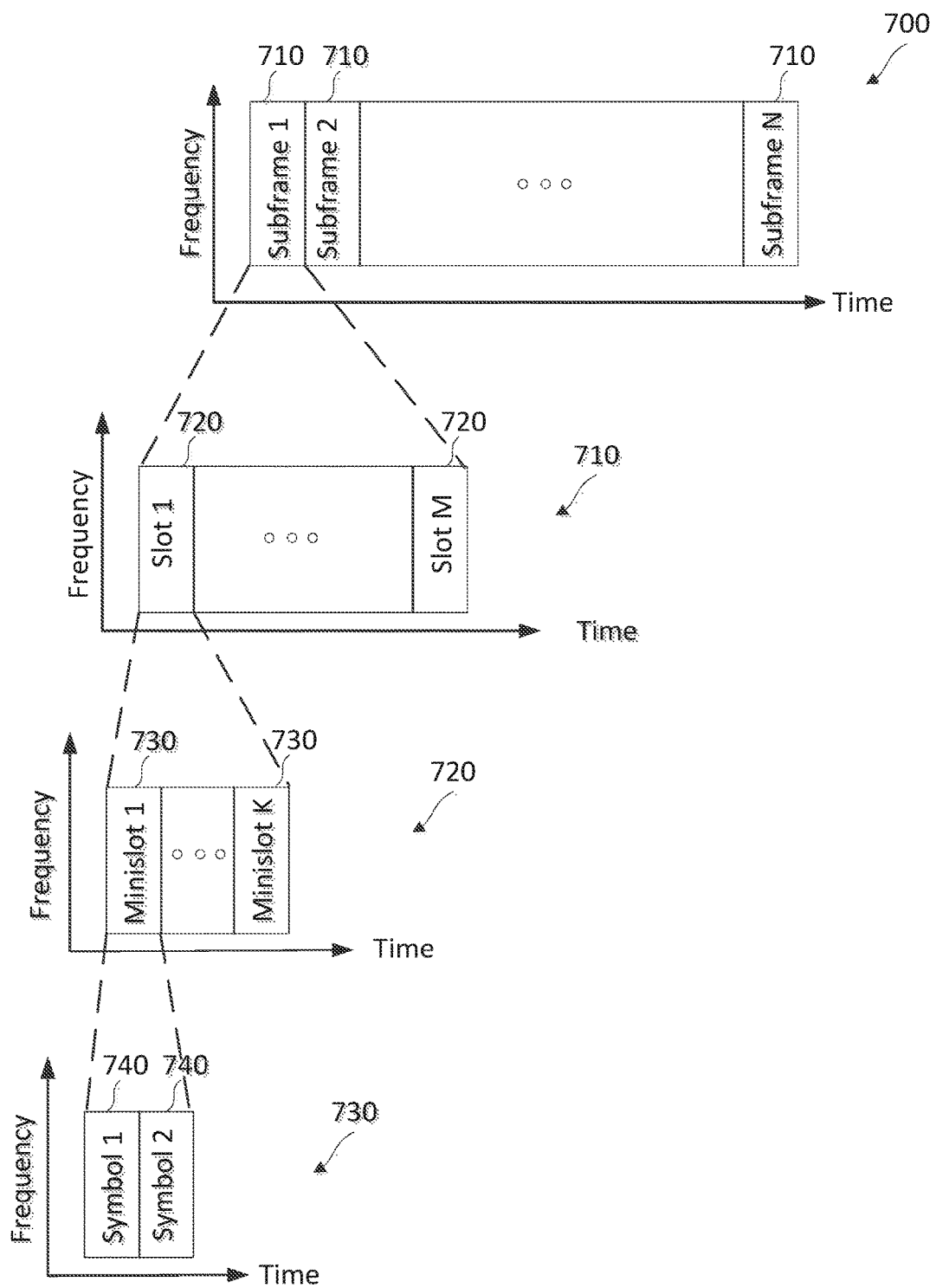
FIG. 7 illustrates a radio frame according to embodiments of the present disclosure.

FIG. 7 illustrates a radio frame 700 according to embodiments of the present disclosure. The radio frame 700 may be employed by the networks 100, 200, and 300. In particular, BSs such as the BSs 104, 204, and 500 and UEs such as the UEs 102, 202, and 400 may exchange data using the radio frame 700. In FIG. 7, the x-axes represent time in some constant units and the y-axes represent frequency in some constant units. The radio frame 700 includes N plurality of subframes 710 spanning in time and frequency. In an embodiment, a radio frame 700 may span a time interval of about 10 milliseconds (ms). Each subframe 710 includes M plurality of slots 720. Each slot 720 includes K plurality of mini-slots 730. Each slot 730 may include one or more symbols 740. N, M, and K may be any suitable positive integers. The BSs or the UEs may send data in units of subframes 710, slots 720, or mini-slots 730.

In addition to sending UL control information in multiple beam directions, a UE may include multiple repetitions or multiple encoded RVs of the UL control information in each PUCCH transmission over a particular beam direction (e.g., the beam directions 210, 220, and 310) to mitigate blocking effects. Thus, a PUCCH transmission may span one or more symbols 740, one or more mini-slots 730, one or more slots 720, or one or more subframes 710. Thus, PUCCH transmissions may have a variable length (e.g., a variable time duration). As an example, each subframe 710 may include 2 slots 720, each slot 720 may include 7 symbols 740, and each repetition of UL control information may be transmitted in 2 symbols 740. Thus, a PUCCH TTI may span more than one slot 720 to include 8 repetitions. In addition, PUCCH transmissions carrying the same UL control information may span the same duration or different durations. In an embodiment, a BS may schedule and allocate resources for transmissions of UL control information and indicate the schedule or the allocations in a PDCCH or via a RRC message, as described in greater detail herein.

Figure 8:
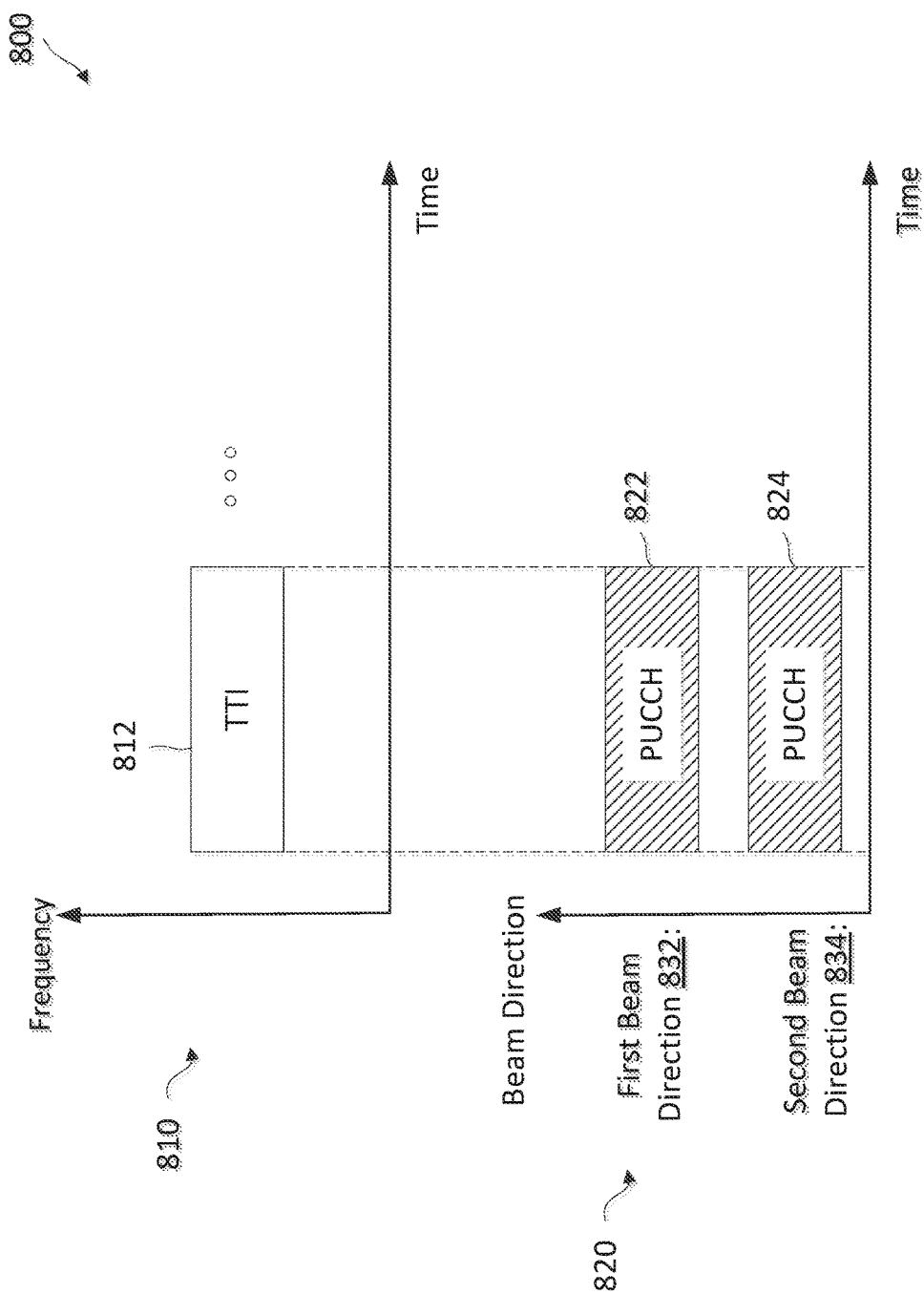
FIG. 8 illustrates a transmission scheme for simultaneous transmissions of physical uplink control channel (PUCCH) signals over multiple beams according to embodiments of the present disclosure.

FIG. 8 illustrates a transmission scheme 800 for simultaneous transmissions of PUCCH signals over multiple beams according to embodiments of the present disclosure. The scheme 800 may be employed by the UEs 102, 202, and 400. In FIG. 8, the timing diagram 810 shows over-the-air transmission timing, where the x-axis represents time in some constant units and the y-axis presents frequency in some constant units. The timing diagram 820 shows transmission timing at a UE, where the x-axis represents time aligned to the timing diagram 810 and the y-axis represents beam direction. In the scheme 800, the UE simultaneously transmit the UL control information in multiple beam directions. As shown, the UE simultaneously transmits a PUCCH signal 822 in a first beam direction 832 and a PUCCH signal 824 in a second beam direction 834 carrying the UL control information in the same TTI 812. The TTI 812 may include one or more mini-slots 730, one or more slots 720, or one or more subframes 710.

In one embodiment, the first beam direction 832 (e.g., the beam direction 210a) and the second beam direction (e.g., the beam direction 220b) are directed to different BSs as shown and described with respect to FIG. 2. In another embodiment, the first beam direction 832 (e.g., the beam direction 310a) and the second beam direction 834 (e.g., the beam direction 310b) are directed to the same BS as shown and described with respect to FIG. 3.

In one embodiment, the PUCCH signals 822 and 824 may carry identical copy of the UL control information. In another embodiment, the PUCCH signals 822 and 824 may carry different redundancy versions of the UL control information. For example, the UE may employ an error encoding scheme, such as a convolutional code, to encode the UL control information. The UE may send one set of redundancy along with the UL control information bits in the PUCCH signal 822 and another set of redundancy bits with the UL control information in the PUCCH signal 824. Alternatively, the UE may send the UL control information in the PUCCH signal 822 and the redundancy bits in the PUCCH signal 824. In some other embodiments, the PUCCH signals 822 and 824 may carry different portions of the UL control information. In some embodiments, each PUCCH transmission may include a demodulation reference signal (DMRS) pattern to allow independent channel estimation. Thus, the PUCCH signals 822 and 824 are self-decodable. While FIG. 8 illustrates the PUCCH signals 822 and 824 spanning the same duration and the same frequency, the PUCCH signals 822 and 824 may span different durations and/or different frequencies.

To support simultaneous transmissions over multiple beams, the UE may include multiple antenna subarrays, each having an array of antennas (e.g., the antennas 516) and a plurality of digital transceiver chains (e.g., transceiver 510). The UE may partition the digital transceiver chains into a multiple links, each coupled to an antenna subarray. The UE may simultaneously transmit the PUCCH signal 822 via one digital transceiver chain and a corresponding antenna subarray and the PUCCH signal 824 via another digital transceiver chain and a corresponding antenna subarray.

Figure 9:
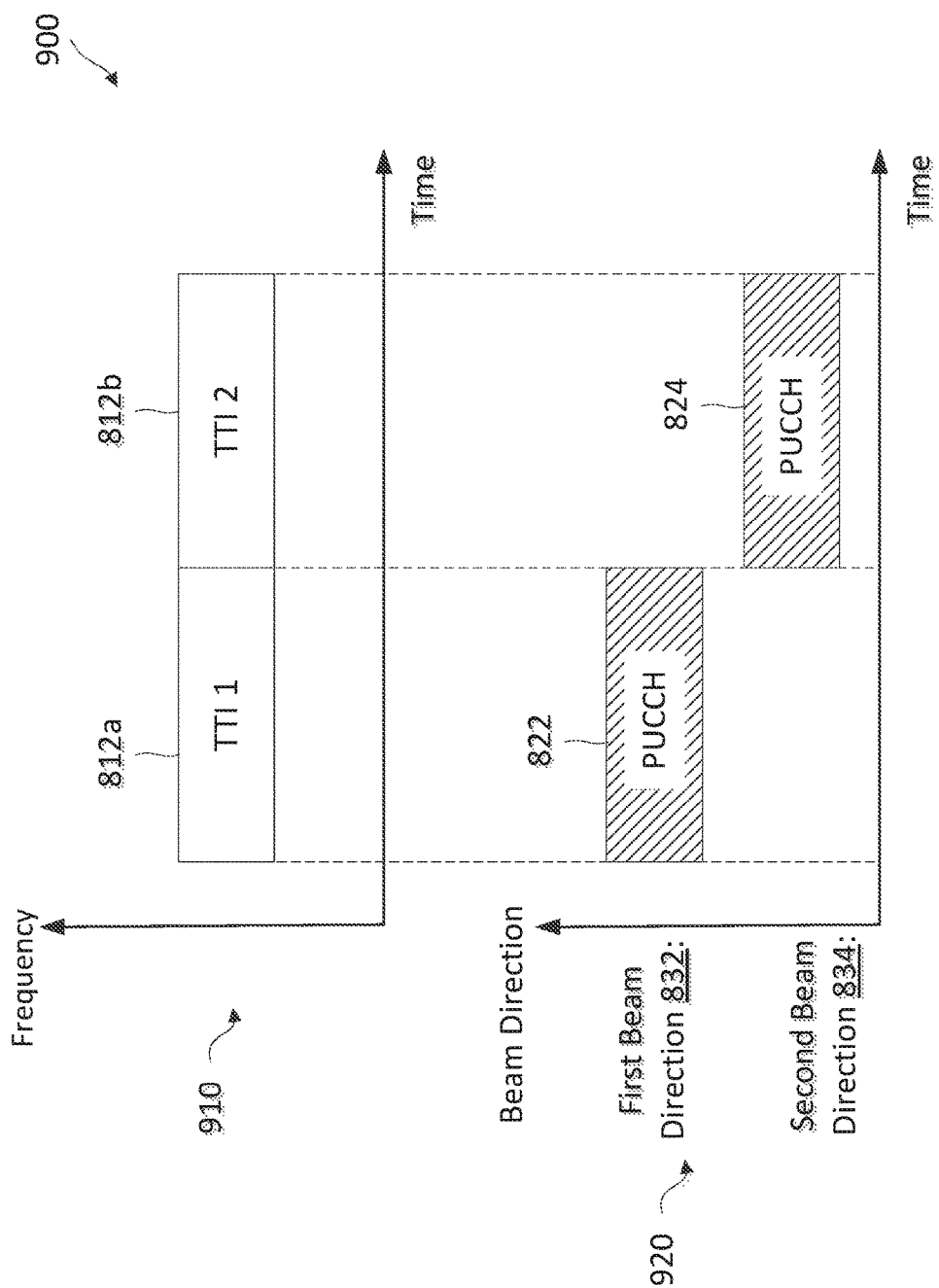
FIG. 9 illustrates a time-division multiplexing (TDM)-based transmission scheme for transmissions of PUCCH signals over multiple beams according to embodiments of the present disclosure.

FIG. 9 illustrates a TDM-based transmission scheme 900 for transmissions of PUCCH signals over multiple beams according to embodiments of the present disclosure. The scheme 800 may be employed by the UEs 102, 202, and 400. In FIG. 9, the timing diagram 910 shows over-the-air transmission timing, where the x-axis represents time in some constant units and the y-axis presents frequency in some constant units. The timing diagram 920 shows transmission timing at a UE, where the x-axis represents time aligned to the timing diagram 910 and the y-axis represents beam direction. In the scheme 900, the UE employ a TDM scheme to transmit the PUCCH signals 822 and 824 over multiple beams instead of simultaneously as in the scheme 800. As shown, the UE transmits the PUCCH signal 822 in the first beam direction 832 in a TTI 812a and the PUCCH signal 824 in the second beam direction 834 in another TTI 812b. While FIG. 9 illustrates the transmission of the PUCCH signals 822 and 824 in consecutive TTIs 812 spanning the same frequency, the transmissions of the PUCCH signals 822 and 824 may be spaced apart in time and/or spanning different frequencies.

Figure 10:
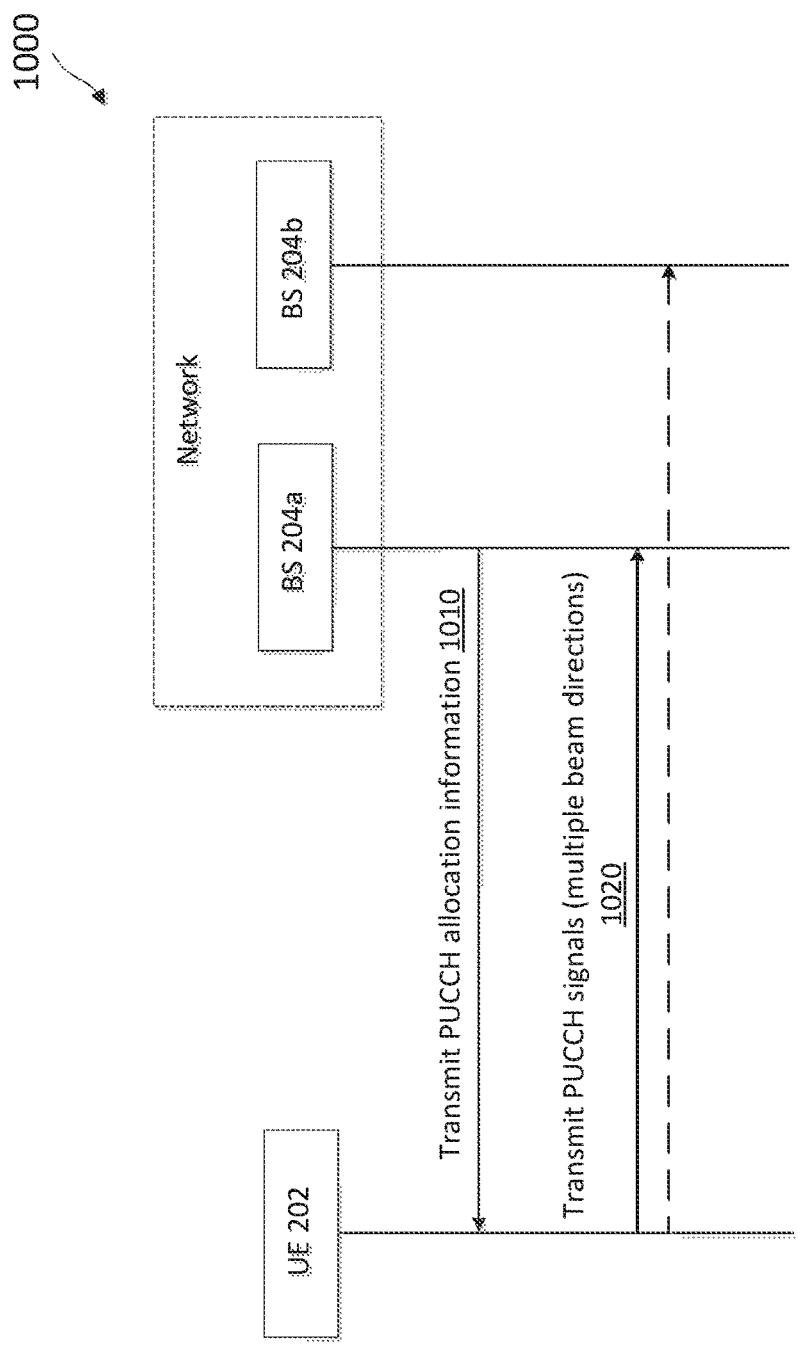
FIG. 10 is a signaling diagram of a method of signaling and transmitting PUCCH signals according to embodiments of the present disclosure.

FIG. 10 is a signaling diagram of a method 1000 of signaling and transmitting PUCCH signals, such as the PUCCH signals 822 and 824, according to embodiments of the present disclosure. Steps of the method 1000 can be executed by computing devices (e.g., a processor, processing circuit, and/or other suitable component) of wireless communication devices, such as the BSs 104, 204, and 500 and the UEs 102, 202, and 400. The method 1000 can be better understood with reference to FIGS. 2, 3, 8, and 9. As illustrated, the method 1000 includes a number of enumerated steps, but embodiments of the method 1000 may include additional steps before, after, and in between the enumerated steps. In some embodiments, one or more of the enumerated steps may be omitted or performed in a different order. The method 1000 illustrates two BSs 204 (e.g., the BSs 204a and 204b) and one UE 202 for purposes of simplicity of discussion, though it will be recognized that embodiments of the present disclosure may scale to many more UEs 202 and/or BSs 204. The BSs 204a and 204b may communicate with each other via a network. In one embodiment, the BSs 204a and 204b are eNBs including baseband processing. In another embodiment, the BSs 240a and 204b are TXPs, where baseband processing is performed at a central unit (e.g., the central unit 600).

At step 1010, the BS 204a transmits PUCCH allocation information to the UE 202. In one embodiment, the BS 204a may transmit the PUCCH allocation information in a PDCCH. The PDCCH may indicate resources allocated to the UE 202 for transmissions of UL control information over multiple beams. For example, the PDCCH may indicate an allocation in a first beam direction (e.g., the beam directions 210, 220, 310, 832, and 834) and an allocation in a second beam direction. The allocations may be similar to the TTIs 812. Accordingly, in some instances, the BS 204a may configure a PUCCH allocation or transmission configuration to indicate a first beam direction and a second beam direction. In some instances, the BS 204a may further configure the PUCCH allocation or transmission configuration to indicate a first TTI (e.g., the TTIs 812) for the first beam direction and a second TTI for the second beam direction as shown in the schemes 800 and 900.

In another embodiment, the BS 204a may transmit a RRC message indicating a transmission configuration for transmitting UL control information over multiple beams. For example, the RRC message may indicate that each PUCCH allocation may include allocations in multiple beam directions. In some embodiments, the PUCCH allocation information may be indicated through a combination of PDCCH signaling and RRC messages.

At step 1020, the UE 202 transmits PUCCH signals (e.g., the PUCCH signals 822 and 824) carrying the same UL control information in multiple beam directions. In one embodiment, the multiple beam directions are directed to different BSs 204 as shown in the network 200. For example, one beam direction is directed towards the BS 204a and another beam direction is directed towards the BS 204b as shown by the dashed arrow. In another embodiment, the multiple beam directions are directed to the same BS 204a as shown in the network 300. The UE 202 may employ the schemes 800 or 900 for the transmissions.

In one embodiment, the UE 202 may transmit identical encoded UL control information in each TTI in each beam direction. Upon receiving the PUCCH signals, the BSs 204a and/or the 204b may individually or jointly decode the PUCCH signals to recover the UL control information.

In another embodiment, the UE 202 may transmit a different encoded RV of the UL control information in each TTI in each beam direction using similar resource structures as control channel elements (CCEs) and resource element groups (REGs) of LTE PDCCHs and circular-type rate matching. CCEs and REGs refer to a set of symbols and subcarriers or frequency tones. In LTE PDCCH, each CCE and each REG are self-decodable. Rate matching refers to extracting a set of encoded bits for transmissions in a TTI to match a particular coding or transmission rate. In some embodiments, rate matching may employ a circular buffer to collect encoded bits and the encoded bits may be punctured or repeated to match the particular rate. To facilitate the RV encodings, the BS 204a may instruct the UE 202 to employ a particular RV in a particular beam direction. Alternatively, the UE 202 may select a RV for a beam direction based on a pre-determined rule. Upon receiving the PUCCH signals, the BSs 204a and/or the 204b may individually or jointly decode the PUCCH signals to recover the UL control information. By transmitting a complete encoded version of the UL control information in each TTI, the BSs 204a and 204b may decode a PUCCH signal carried in a TTI independent of another PUCCH signal carried in another TTI.

Figure 11:
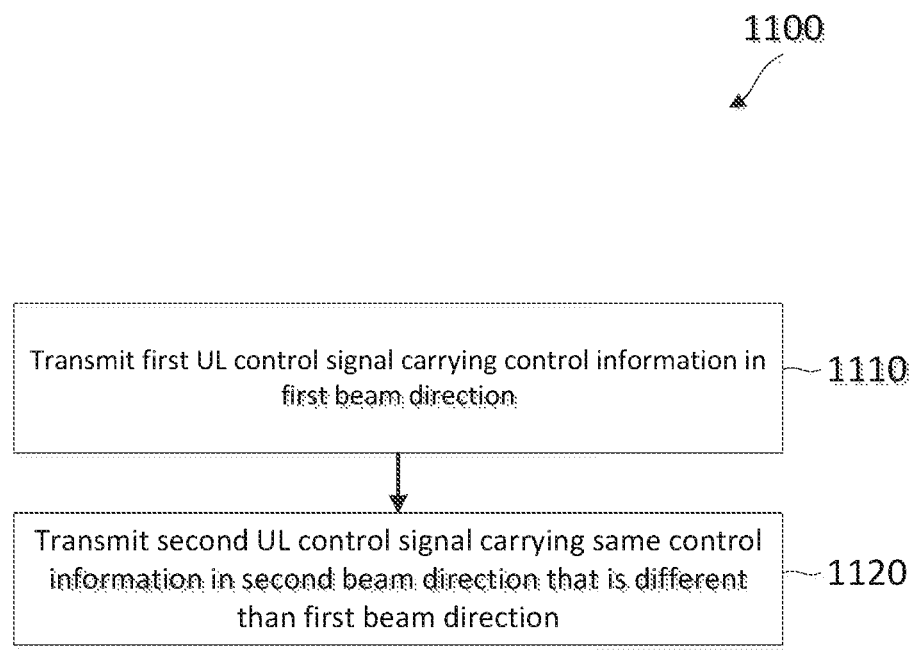
FIG. 11 is a flow diagram of a method of transmitting UL control information over multiple beams.

FIG. 11 is a flow diagram of a method 1100 of transmitting UL control information over multiple beams. Steps of the method 1100 can be executed by a computing device (e.g., a processor, processing circuit, and/or other suitable component) of a wireless communication device, such as the UEs 102, 202, and 400. The method 1100 may employ similar mechanisms as in the transmission schemes described with respect to FIGS. 2 and 3 and the schemes 800 and 900. The method 1100 can be better understood with reference to FIGS. 2 and 3. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes transmitting, a first UL control signal (e.g., the PUCCH signal 822) in a first beam direction (e.g., the beam directions 210a and 832). The first UL control signal carries or represents UL control information (e.g., a CQI, an ACK, or a NAK).

At step 1120, the method 1100 includes transmitting, a second UL control signal (e.g., the PUCCH signal 824) in a second beam direction (e.g., the beam directions 210b and 834). The second UL control signal carries or represents the same UL control information as the first UL control signal. The first UL control signal and the second UL control signal may be transmitted according to the scheme 800 or 900. The first UL control signal and the second UL control signal may carry the same encoded version of the UL control information or different encoded versions of the UL control information. The first beam direction and the second beam direction may be different beam directions. For example, the first UL control signal and the second control signal may have a greatest signal power directing towards different spatial directions (e.g., angular directions). In some embodiments, the first beam direction and the second beam direction are received in a transmission configuration from a BS as in the method 1000.

Figure 12:
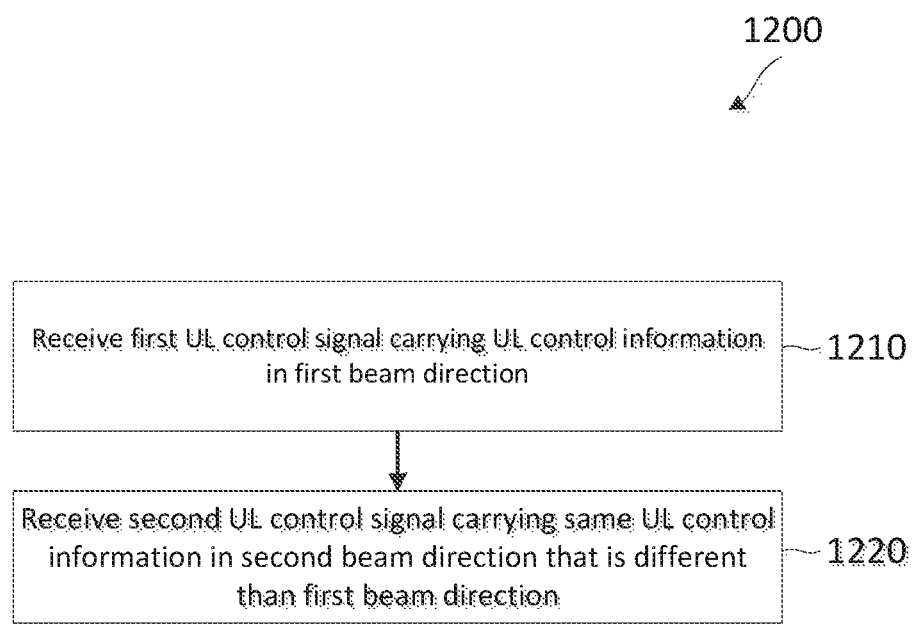
FIG. 12 is a flow diagram of a method of receiving UL control information from multiple beams according to embodiments of the present disclosure.

FIG. 12 is a flow diagram of a method 1200 of receiving UL control information from multiple beams according to embodiments of the present disclosure. Steps of the method 1200 can be executed by a computing device (e.g., a processor, processing circuit, and/or other suitable component) of a communication device, such as the BS 104, 204, and 500 and the central unit 600. The method 1200 may employ similar mechanisms as in the transmission schemes described with respect to FIGS. 2 and 3 and the schemes 800 and 900. The method 1200 can be better understood with reference to FIGS. 2 and 3. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes receiving, a first UL control signal (e.g., the PUCCH signal 832) from a first beam direction (e.g., the beam directions 210, 220, 310, 832, and 834). The first UL control signal carries UL control information (e.g., a CQI, an ACK, or a NAK).

At step 1220, the method 1200 includes receiving, a second UL control signal (e.g., the PUCCH signal 834) from a second beam direction. The second UL control signal carries the same UL control information. The first UL control signal and the second UL control signal may be received in the same TTI (e.g., the TTI 812) or different TTIs as shown in the scheme 800 or 900, respectively. In some embodiments, the wireless communication device may transmit a transmission configuration indicating the first beam direction and the second beam direction as in the method 1000 and receive the first UL control signal and the second UL control signal according to the transmission configuration.

The first UL control signal and the second UL control signal may carry or represent the same encoded version of the UL control information or different encoded versions of the UL control information. In an embodiment, when the communication device is a central unit, the central unit may be in communication with a first TXP and a second TXP and receive the first UL control signal and the second control signal via the first TXP and the second TXP, respectively.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication, comprising transmitting, by a first wireless communication device, a first uplink control signal in a first beam direction; and transmitting, by the first wireless communication device, a second uplink control signal in a second beam direction, wherein the first uplink control signal and the second uplink control signal carry same control information, and wherein the first beam direction and the second beam direction are different.

The method further includes wherein the first uplink control signal is transmitted in the first beam direction in a first transmission time interval, wherein the second uplink control signal is transmitted in the second beam direction in a second transmission time interval, and wherein the first transmission time interval and the second transmission time interval include one or more symbols. The method further includes wherein the first transmission time interval and the second transmission time interval are the same transmission time interval. The method further includes wherein the second transmission time interval is after the first transmission time interval. The method further includes receiving, by the first wireless communication device, a transmission configuration for uplink control information transmission, wherein the first uplink control signal and the second uplink control signal are transmitted based on the transmission configuration. The method further includes wherein the transmission configuration indicates the first transmission time interval and the second transmission time interval. The method further includes wherein the first uplink control signal carries the control information encoded based on a first redundancy version (RV), and wherein the second uplink control signal carries the control information encoded based on a second RV that is different than the first RV. The method further includes wherein the first beam direction and the second beam direction are each directed towards a second wireless communication device. The method further includes wherein the first beam direction is directed towards a second wireless communication device, and wherein the second beam direction is directed towards a third wireless communication device.

Embodiments of the present disclosure include a method of wireless communication, comprising receiving, by a communication device, a first uplink control signal from a first beam direction; and receiving, by the communication device, a second uplink control signal from a second beam direction, wherein the first uplink control signal and the second uplink control signal carry same control information, and wherein the first beam direction and the second beam direction are different.

The method further includes wherein the first uplink control signal is received from the first beam direction in a first transmission time interval, wherein the second uplink control signal is received from the second beam direction in a second transmission time interval, and wherein the first transmission time interval and the second transmission time interval include one or more symbols. The method further includes wherein the first transmission time interval and the second transmission time interval are the same transmission time interval. The method further includes wherein the second transmission time interval is after the first transmission time interval. The method further includes decoding, by the communication device, the first uplink control signal in the first transmission time interval independent of the second uplink control signal. The method further includes wherein the first uplink control signal carries the control information encoded based on a first redundancy version (RV), and wherein the second uplink control signal carries the control information encoded based on a second RV that is different than the first RV. The method further includes transmitting, by the communication device, a transmission configuration for uplink control information transmission in multiple beam directions, and wherein the first uplink control signal and the second uplink control signal are received based on the transmission configuration. The method further includes wherein the communication device is in communication with a first transmission point (TXP), wherein the communication device is in communication with a second TXP that is different than the first TP, wherein the first uplink control signal is received via the first TXP, and wherein the second uplink control signal is received via the second TXP. The method further includes wherein the communication device is in communication with a transmission point (TXP), and wherein the first uplink control signal and the second uplink control signal are received via the same TXP.

Embodiments of the present disclosure include an apparatus comprising a transmitter configured to transmit a first uplink control signal in a first beam direction; and transmit a second uplink control signal in a second beam direction, wherein the first uplink control signal and the second uplink control signal carry same control information, and wherein the first beam direction and the second beam direction are different.

The apparatus further includes wherein the first uplink control signal is transmitted in the first beam direction in a first transmission time interval, wherein the second uplink control signal is transmitted in the second beam direction in a second transmission time interval, and wherein the first transmission time interval and the second transmission time interval include one or more symbols. The apparatus further includes wherein the first transmission time interval and the second transmission time interval are the same transmission time interval. The apparatus further includes wherein the second transmission time interval is after the first transmission time interval. The apparatus further includes a receiver configured to receive a transmission configuration for uplink control information transmission, wherein the first uplink control signal and the second uplink control signal are transmitted based on the transmission configuration. The apparatus further includes wherein the transmission configuration indicates the first transmission time interval and the second transmission time interval. The apparatus further includes wherein the first uplink control signal carries the control information encoded based on a first redundancy version (RV), and wherein the second uplink control signal carries the control information encoded based on a second RV that is different than the first RV. The apparatus further includes wherein the first beam direction and the second beam direction are each directed towards a wireless communication device. The apparatus further includes wherein the first beam direction is directed towards a first wireless communication device, and wherein the second beam direction is directed towards a second wireless communication device.

Embodiments of the present disclosure includes an apparatus comprising a received configured to receive a first uplink control signal from a first beam direction; and receive a second uplink control signal from a second beam direction, wherein the first uplink control signal and the second uplink control signal carry same control information, and wherein the first beam direction and the second beam direction are different.

The apparatus further includes wherein the first uplink control signal is received from the first beam direction in a first transmission time interval, wherein the second uplink control signal is received from the second beam direction in a second transmission time interval, and wherein the first transmission time interval and the second transmission time interval include one or more symbols. The apparatus further includes wherein the first transmission time interval and the second transmission time interval are the same transmission time interval. The apparatus further includes wherein the second transmission time interval is after the first transmission time interval. The apparatus further includes a processor configured to decode the first uplink control signal in the first transmission time interval independent of the second uplink control signal. The apparatus further includes wherein the first uplink control signal carries the control information encoded based on a first redundancy version (RV), and wherein the second uplink control signal carries the control information encoded based on a second RV that is different than the first RV. The apparatus further includes a transmitter configured to transmit a transmission configuration for uplink control information transmission in multiple beam directions, wherein the first uplink control signal and the second uplink control signal are received based on the transmission configuration. The apparatus is further in communication with a first transmission point (TXP), wherein the apparatus is in communication with a second TXP that is different than the first TP, wherein the first uplink control signal is received via the first TXP, and wherein the second uplink control signal is received via the second TXP. The apparatus is further in communication with a transmission point (TXP), and wherein the first uplink control signal and the second uplink control signal are received via the same TXP. The apparatus further includes Embodiments of the present disclosure further include a computer-readable medium having program code recorded thereon, the program code comprising code for causing a first wireless communication device to transmit a first uplink control signal in a first beam direction; and code for causing the first wireless communication device to transmit a second uplink control signal in a second beam direction, wherein the first uplink control signal and the second uplink control signal carry same control information, and wherein the first beam direction and the second beam direction are different.

The computer-readable medium further includes wherein the first uplink control signal is transmitted in the first beam direction in a first transmission time interval, wherein the second uplink control signal is transmitted in the second beam direction in a second transmission time interval, and wherein the first transmission time interval and the second transmission time interval include one or more symbols. The computer-readable medium further includes wherein the first transmission time interval and the second transmission time interval are the same transmission time interval. The computer-readable medium further includes wherein the second transmission time interval is after the first transmission time interval. The computer-readable medium further includes code for causing the first wireless communication device to receive a transmission configuration for uplink control information transmission, wherein the first uplink control signal and the second uplink control signal are transmitted based on the transmission configuration. The computer-readable medium further includes wherein the transmission configuration indicates the first transmission time interval and the second transmission time interval. The computer-readable medium further includes wherein the first uplink control signal carries the control information encoded based on a first redundancy version (RV), and wherein the second uplink control signal carries the control information encoded based on a second RV that is different than the first RV. The computer-readable medium further includes wherein the first beam direction and the second beam direction are each directed towards a second wireless communication device. The computer-readable medium further includes wherein the first beam direction is directed towards a second wireless communication device, and wherein the second beam direction is directed towards a third wireless communication device.

Embodiments of the present disclosure further include a computer-readable medium having program code recorded thereon, the program code comprising code for causing a communication device to receive a first uplink control signal from a first beam direction; and code for causing the communication device to receive a second uplink control signal from a second beam direction, wherein the first uplink control signal and the second uplink control signal carry same control information, and wherein the first beam direction and the second beam direction are different.

The computer-readable medium further includes wherein the first uplink control signal is received from the first beam direction in a first transmission time interval, wherein the second uplink control signal is received from the second beam direction in a second transmission time interval, and wherein the first transmission time interval and the second transmission time interval include one or more symbols. The computer-readable medium further includes wherein the first transmission time interval and the second transmission time interval are the same transmission time interval. The computer-readable medium further includes wherein the second transmission time interval is after the first transmission time interval. The computer-readable medium further includes code for causing the communication device to decode the first uplink control signal in the first transmission time interval independent of the second uplink control signal. The computer-readable medium further includes wherein the first uplink control signal carries the control information encoded based on a first redundancy version (RV), and wherein the second uplink control signal carries the control information encoded based on a second RV that is different than the first RV. The computer-readable medium further includes code for causing the communication device to transmit a transmission configuration for uplink control information transmission in multiple beam directions, wherein the first uplink control signal and the second uplink control signal are received based on the transmission configuration. The computer-readable medium further includes wherein the communication device is in communication with a first transmission point (TXP), wherein the communication device is in communication with a second TXP that is different than the first TP, wherein the first uplink control signal is received via the first TXP, and wherein the second uplink control signal is received via the second TXP. The computer-readable medium further includes wherein the communication device is in communication with a transmission point (TXP), and wherein the first uplink control signal and the second uplink control signal are received via the same TXP.

Embodiments of the present disclosure further include an apparatus comprising means for transmitting a first uplink control signal in a first beam direction; and means for transmitting a second uplink control signal in a second beam direction, wherein the first uplink control signal and the second uplink control signal carry same control information, and wherein the first beam direction and the second beam direction are different.

The apparatus further includes wherein the first uplink control signal is transmitted in the first beam direction in a first transmission time interval, wherein the second uplink control signal is transmitted in the second beam direction in a second transmission time interval, and wherein the first transmission time interval and the second transmission time interval include one or more symbols. The apparatus further includes wherein the first transmission time interval and the second transmission time interval are the same transmission time interval. The apparatus further includes wherein the second transmission time interval is after the first transmission time interval. The apparatus further includes means for receiving a transmission configuration for uplink control information transmission, wherein the first uplink control signal and the second uplink control signal are transmitted based on the transmission configuration. The apparatus further includes wherein the transmission configuration indicates the first transmission time interval and the second transmission time interval. The apparatus further includes wherein the first uplink control signal carries the control information encoded based on a first redundancy version (RV), and wherein the second uplink control signal carries the control information encoded based on a second RV that is different than the first RV. The apparatus further includes wherein the first beam direction and the second beam direction are each directed towards a wireless communication device. The apparatus further includes wherein the first beam direction is directed towards a first wireless communication device, and wherein the second beam direction is directed towards a second wireless communication device.

Embodiments of the present disclosure further include an apparatus comprising means for receiving a first uplink control signal from a first beam direction; and means for receiving a second uplink control signal from a second beam direction, wherein the first uplink control signal and the second uplink control signal carry same control information, and wherein the first beam direction and the second beam direction are different.

The apparatus further includes wherein the first uplink control signal is received from the first beam direction in a first transmission time interval, wherein the second uplink control signal is received from the second beam direction in a second transmission time interval, and wherein the first transmission time interval and the second transmission time interval include one or more symbols. The apparatus further includes wherein the first transmission time interval and the second transmission time interval are the same transmission time interval. The apparatus further includes wherein the second transmission time interval is after the first transmission time interval. The apparatus further includes means for decoding the first uplink control signal in the first transmission time interval independent of the second uplink control signal. The apparatus further includes wherein the first uplink control signal carries the control information encoded based on a first redundancy version (RV), and wherein the second uplink control signal carries the control information encoded based on a second RV that is different than the first RV. The apparatus further includes means for transmitting a transmission configuration for uplink control information transmission in multiple beam directions, wherein the first uplink control signal and the second uplink control signal are received based on the transmission configuration. The apparatus is further in communication with a first transmission point (TXP) and with a second TXP that is different than the first TP, wherein the first uplink control signal is received via the first TXP, and wherein the second uplink control signal is received via the second TXP. The apparatus is further in communication with a transmission point (TXP), and wherein the first uplink control signal and the second uplink control signal are received via the same TXP.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   receiving, by a first wireless communication device from a second wireless communication device, a transmission configuration indicating a first beam resource and a second, different beam resource allocated to the first wireless communication device by the second wireless communication device, the first beam resource including a first beam direction, and the second beam resource including a second, different beam direction;
   transmitting, by the first wireless communication device to the second wireless communication device, a first uplink control signal on the allocated first beam resource using the first beam direction; and
   transmitting, by the first wireless communication device to the second wireless communication device, a second uplink control signal on the allocated second beam resource using the second beam direction, with the same encoded control information represented in the first uplink control signal.

2. The method of claim 1, further comprising:
   obtaining, by the first wireless communication device, a first frequency resource of the allocated first beam resource;
   obtaining, by the first wireless communication device, a second, different frequency resource of the allocated second beam resource;
   transmitting the first uplink control signal further using the first frequency resource; and
   transmitting the second uplink control signal further using the second frequency resource.

3. The method of claim 1, further comprising:
   configuring, by the first wireless communication device, a first transmission time interval based on a time resource of the allocated first beam resource;
   configuring, by the first wireless communication device, a second transmission time interval to at least partially overlap with the first transmission time interval based on a time resource of the allocated second beam resource, the first transmission time interval and the second transmission time interval each include one or more symbols;

transmitting the first uplink control signal during the first transmission time interval; and
transmitting the second uplink control signal during the second transmission time interval.

4. The method of claim 1, further comprising:
configuring, by the first wireless communication device, a first transmission time interval based on a time resource of the allocated first beam resource;
configuring, by the first wireless communication device, a second transmission time interval non-overlapping with the first transmission time interval based on a time resource of the allocated second beam resource, the first transmission time interval and the second transmission time interval each include one or more symbols;
transmitting the first uplink control signal during the first transmission time interval; and
transmitting the second uplink control signal during the second transmission time interval.

5. The method of claim 1, further comprising:
transmitting the first uplink control signal carrying the control information encoded based on a first redundancy version (RV); and
transmitting the second uplink control signal carrying the control information encoded based on a second RV that is different than the first RV.

6. The method of claim 1, further comprises:
transmitting the first uplink control signal on the first beam resource directing towards a second wireless communication device; and
transmitting the second uplink control signal on the second beam resource directing towards the second wireless communication device.

7. The method of claim 1, further comprising:
transmitting the first uplink control signal on the first beam resource directing towards a second wireless communication device; and
transmitting the second uplink control signal on the second beam resource directing towards a third wireless communication device that is different from the second wireless communication device.

8. A method of wireless communication, comprising:
allocating, by a first wireless communication device, a first beam resource and a second, different beam resource to a second wireless communication device, the first beam resource including a first beam direction, and the second beam resource including a second, different beam direction;
transmitting, by the first wireless communication device to the second wireless communication device, a transmission configuration indicating the allocated first beam resource and the allocated second, different beam resource;
receiving, by the first wireless communication device from the second wireless communication device, a first uplink control signal on the allocated first beam resource, the first uplink control signal received from the first beam direction; and
receiving, by the first wireless communication device from the second wireless communication device, a second uplink control signal on the allocated second beam resource, with the same encoded control information represented in the first uplink control signal, the second uplink control signal received from the second beam direction.

9. The method of claim 8, further comprising:
configuring, by the first wireless communication device, the first beam resource to include a first frequency resource;
configuring, by the first wireless communication device, the second beam resource to include a second, different frequency resource;
receiving the first uplink control signal from the first frequency resource; and
receiving the second uplink control signal from the second frequency resource.

10. The method of claim 8, further comprising:
configuring, by the first wireless communication device, the first beam resource to include a first transmission time interval;
configuring, by the first wireless communication device, the second beam resource to include a second transmission time interval to at least partially overlap with the first transmission time interval, wherein the first transmission time interval and the second transmission time interval each include one or more symbols;
receiving the first uplink control signal in the first transmission time interval; and
receiving the second uplink control signal in the second transmission time interval.

11. The method of claim 8, further comprising:
configuring, by the first wireless communication device, the first beam resource to include a first transmission time interval;
configuring, by the first wireless communication device, the second beam resource to include a second transmission time interval non-overlapping with the first transmission time interval, wherein the first transmission time interval and the second transmission time interval each include one or more symbols;
receiving the first uplink control signal in the first transmission time interval; and
receiving the second uplink control signal in the second transmission time interval.

12. The method of claim 8, further comprising:
receiving the first uplink control signal carrying the control information encoded based on a first redundancy version (RV);
receiving the second uplink control signal carrying the control information encoded based on a second RV that is different than the first RV; and
decoding, by the first wireless communication device, the first uplink control signal independent of the second uplink control signal.

13. The method of claim 8, further comprising transmitting the transmission configuration in multiple beam directions.

14. The method of claim 8, further comprising:
receiving the first uplink control signal via a first transmission point (TXP); and
receiving the second uplink control signal via a second TXP that is different than the first TXP.

15. The method of claim 8, further comprising:
receiving the first uplink control signal via a transmission point (TXP); and
receiving the second uplink control signal via the TXP.

16. An apparatus comprising:
one or more antennas; and
a transceiver configured to:
receive, via the one or more antennas from a second wireless communication device, a transmission configuration indicating a first beam resource and a second, different beam resource allocated to the apparatus by the second wireless communication device, the first beam resource including a first beam direction, and the second beam resource including a second, different beam direction;

transmit, via the one or more antennas to the second wireless communication device, a first uplink control signal on the allocated first beam resource using the first beam direction; and transmit, via the one or more antennas to the second wireless communication device, a second uplink control signal on the allocated second beam resource using the second beam direction, with the same encoded control information represented in the first uplink control signal.

17. The apparatus of claim 16, wherein the first beam resource includes a first frequency resource, wherein the second beam resource includes a second, different frequency resource, wherein the first uplink control signal is transmitted further using the first frequency resource, and wherein the second uplink control signal is further transmitted using the second frequency resource.

18. The apparatus of claim 16, wherein the first beam resource includes a first transmission time interval, wherein the second beam resource includes a second transmission time interval at least partially overlapping with the first transmission time interval, wherein the first transmission time interval and the second transmission time interval each include one or more symbols, wherein the first uplink control signal is transmitted during the first transmission time interval, and wherein the second uplink control signal is transmitted during the second transmission time interval.

19. The apparatus of claim 16, wherein the first beam resource includes a first transmission time interval, wherein the second beam resource includes a second transmission time interval non-overlapping with the first transmission time interval, wherein the first transmission time interval and the second transmission time interval each include one or more symbols, wherein the first uplink control signal is transmitted during the first transmission time interval, and wherein the second uplink control signal is transmitted during the second transmission time interval.

20. The apparatus of claim 16, wherein the first uplink control signal carries the control information encoded based on a first redundancy version (RV), and wherein the second uplink control signal carries the control information encoded based on a second RV that is different than the first RV.

21. The apparatus of claim 16, further comprising a processor configured to configure the one or more antennas to direct the transmissions of the first uplink control signal and the second uplink control signal towards the second wireless communication device.

22. The apparatus of claim 16, further comprising a processor configured to:

configure the one or more antennas to direct the transmission of the first uplink control signal towards a first wireless communication device; and configure the one or more antennas to direct the transmission of the second uplink control signal towards the second wireless communication device.

23. An apparatus comprising:
one or more antennas;
a processor configured to allocate a first beam resource and a second, different beam resource to a second wireless communication device, the first beam resource including a first beam direction, and the second beam resource including a second, different beam direction; and a transceiver configured to:
transmit, via the one or more antennas to the second wireless communication device, a transmission configuration indicating the allocated first beam resource and the allocated second, different beam resource;

receive, via the one or more antennas from the second wireless communication device, a first uplink control signal on the allocated first beam resource, the first uplink control signal received from the first beam direction; and receive, via the one or more antennas from the second wireless communication device, a second uplink control signal on the allocated second beam resource, with the same encoded control information represented in the first uplink control signal, the second uplink control signal received from the second beam direction.

24. The apparatus of claim 23, wherein the first beam resource includes a first frequency resource, wherein the second beam resource includes a second, different frequency resource, and wherein the transceiver is further configured to:

receive the first uplink control signal from the first frequency resource; and receive the second uplink control signal from the second frequency resource.

25. The apparatus of claim 23, wherein the first beam resource includes a first transmission time interval, wherein the second beam resource includes a second transmission time interval at least partially overlapping with the first transmission time interval, wherein the first transmission time interval and the second transmission time interval each include one or more symbols, and wherein the transceiver is further configured to:

receive the first uplink control signal in the first transmission time interval; and receive the second uplink control signal in the second transmission time interval.

26. The apparatus of claim 23, wherein the first beam resource includes a first transmission time interval, wherein the second beam resource includes a second transmission time interval non-overlapping with the first transmission time interval, wherein the first transmission time interval and the second transmission time interval each include one or more symbols, and wherein the transceiver is further configured to:

receive the first uplink control signal in the first transmission time interval; and receive the second uplink control signal in the second transmission time interval.

27. The apparatus of claim 23, wherein the first uplink control signal carries the control information encoded based on a first redundancy version (RV), wherein the second uplink control signal carries the control information encoded based on a second RV that is different than the first RV, and wherein the apparatus further comprises a processor configured to decode the first uplink control signal independent of the second uplink control signal.

28. The apparatus of claim 23, wherein the transceiver is further configured to transmit the transmission configuration in multiple beam directions.

29. The apparatus of claim 23, wherein the transceiver is further configured to:

receive the first uplink control signal via a first transmission point (TXP); and receive the second uplink control signal via a second TXP that is different than the first TXP.

30. The apparatus of claim 23, wherein the transceiver is further configured to:
receive the first uplink control signal via a transmission point (TXP); and
receive second uplink control signal via the same TXP.

* * * * *